April 14, 1936. J. G. TOMPKINS Re. 19,930

HOSE SUPPORTER

Original Filed July 10, 1930

Inventor.
James G. Tompkins.
By R. S. Burr,
Att'y.

Reissued Apr. 14, 1936

Re. 19,930

UNITED STATES PATENT OFFICE 19,930

HOSE SUPPORTER

James G. Tompkins, Los Angeles, Calif., assignor, by mesne assignments, to Patent Securities Corporation, Los Angeles County, Calif., a corporation of California Orignal No. 1,859,810, dated May 24, 1932, Serial No. 466,951, July 10, 1930. Application for reissue May 21, 1934, Serial No. 726,775

11 Claims. (Cl. 24—248)

This invention relates to a hose supporter and has as its primary object the provision of a detachable connection between a hose and support which is adapted to be easily and quickly engaged with a hose and readily disengaged therefrom when desired, but which is so fashioned that when applied to a hose, accidental disengagement thereof will be practically obviated.

Another object is to provide a hose supporter of the type embodying a pair of pivotally connected yokes arranged with one of the yokes depending from the other and with the open ends of the yokes presented towards each other, and in which the dependent yoke is adapted to be swung through the other yoke and turned a complete revolution around its axis in such manner as to effect wrapping of a portion of the fabric of a hose around the connected end portion of the swinging yoke, and in which the dependent swinging yoke is so formed that the fabric when engaged therewith will be disposed entirely below the axis of the swinging yoke.

Another object is to provide the swinging yoke with an elastic or resilient cushion which will effect such frictional engagement with fabric wound on the yoke as to prevent slippage of the fabric and insure its being gripped sufficiently to prevent its being accidentally pulled free from its wrapped engagement with the yoke.

With the foregoing object in view, together with such other objects and advantages as may subsequently appear, the invention resides in the parts and in the combination, construction and arrangement of parts hereinafter described and claimed and illustrated by way of example in the accompanying drawing, in which:—

Figure 3:
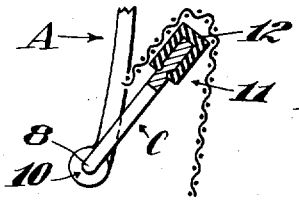
Figure 4:
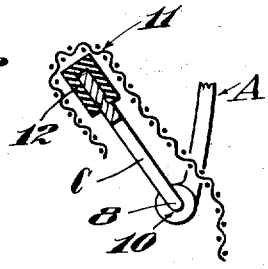
Figure 5:
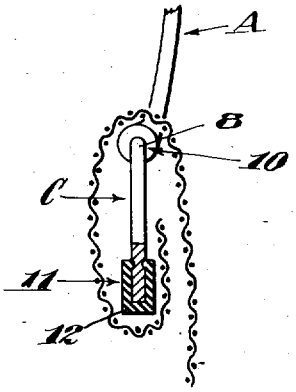

Figs. 3, 4, and 5 are similar sectional views illustrating the mode of effecting connection between the support and the hose fabric.

Figure 6:
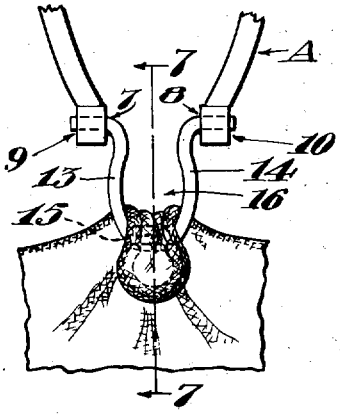
Figure 7:
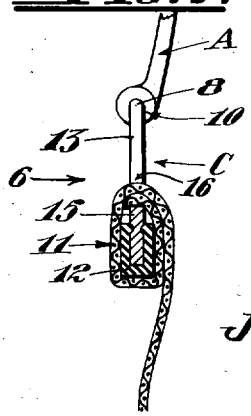

Fig. 6 is a view in elevation showing the manner in which the fabric is positioned on the hose engaging portion of the support when fully attached; as seen in the direction indicated by the arrow 6 in Fig. 7;

Fig. 7 is a diagram in section taken on the line 7—7 of Fig. 6.

Referring to the drawing more specifically, A indicates generally a yoke, the closed end of which is affixed to an elastic strip B or other suitable member of a garter, belt, or the like. The yoke A is rigid, being preferably formed of metal, and pivotally connected to the outer end of the yoke A is a second yoke C which is formed with out-turned end portions 7 and 8 pivotally engaging opposed apertures 9 and 10 in the end portion of the yoke A. The yoke C is formed on its closed end with an extended knob 11, preferably formed with an elastic or resilient cushion 12 and is of such dimensions that it may be swung on its pivot connection through the yoke A.

The yoke C is mounted so that it may be freely swung completely around the axis of its pivotal connection with the yoke A and be disposed in a dependent position relative thereto.

An important feature of the invention resides in forming the yoke C with elongated side members 13 and 14 leading from the pivoted end portions 9 and 10 substantially at right angles thereto to a connecting transverse end bar 15 on which the knob 11 is formed. The yoke C is thus longitudinally elongated and provided with an elongated space 16 extending between the side members 13 and 14 opening unobstructedly to the space between the side members of its support A whereby a fabric may be wrapped around the connecting end portion of the yoke C by rotating the latter as hereinafter described, and will extend through the yoke C with the portion of the fabric leading through the yoke C confined entirely between the side members 13 and 14 thereof below its pivotal connection. The connecting transverse end bar 15 of the yoke C is formed with an elongated straight upper edge extending parallel with the axis of the pivotal mounting of the yoke to afford a flat seat for the fabric when passed between the side members of the yoke and wound around the knob 11. It will be seen that the yoke A constitutes a support for the yoke C and that the latter constitutes a hose engaging member.

Figure 1:
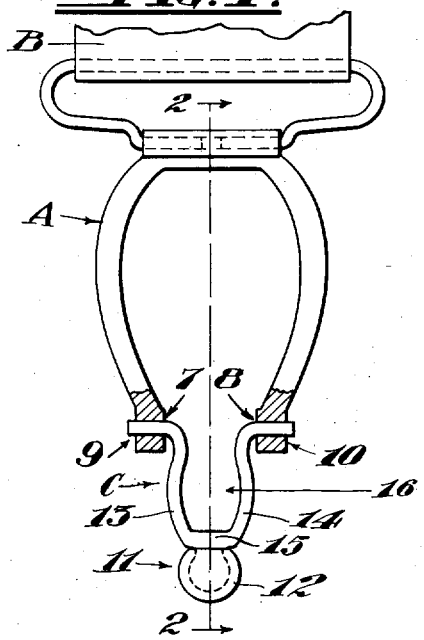
Fig. 1 is a front view of the hose support.
Figure 2:
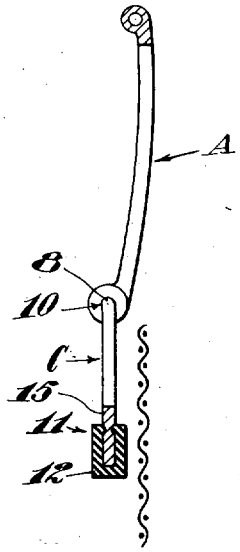
Fig. 2 is a detail in cross section taken on the line 2—2 of Fig. 1, illustrating the manner of initially positioning the hose engaging portion of the support preparatory to effecting connection of a fabric therewith.

In the application and operation of the invention, the support is positioned with the yoke C depending therefrom as shown in Figs. 1 and 2 alongside the portion of the hose or fabric to be engaged thereby, as particularly shown in Fig. 2, whereupon the yoke C is swung upwardly as shown in Fig. 3 to position a portion of the fabric of the hose astride thereof. The yoke C is then advanced through the yoke A as shown in Fig. 4 and brought downwardly to its initial depending position as shown in Fig. 5, whereupon a portion of the fabric will be extended through the yoke C and on being pulled downwardly, or on the yoke C being pulled upwardly, the portion of the hose extending alongside the yoke C will overlap a portion of the fabric engaged over the knob 11 thus effecting such engagement with the fabric that any pull on the latter away from the yoke C will more tightly effect connection between the fabric and the yoke.

The portion of the fabric thus engaged by the hose engaging yoke C will then be positioned thereon as shown in Figs. 6 and 7, that is, wrapped around the knob 11 and disposed well below the axis of the pivotal connection of the yoke C with the supporting yoke A, thus insuring against any accidental unwinding movement of the yoke C being occasioned on opposed pulls being imposed on the hose and the supporter.

By the provision of the elastic or resilient cushion 12 a frictional engagement is effected between the knob 11 and the fabric wrapped therearound such as to prevent the fabric from slipping under pulls imposed thereon while the supporter is in use, and thereby further insuring against the hose becoming accidentally disengaged from the supporter. The cushion 12 thus affords a friction grip which is especially advantageous when the supporter is used in connection with hosiery formed of silk or similar materials which have a tendency to slide on smooth surfaces, and is sufficiently yieldable to not be liable to tear delicate fabrics engaged therewith.

The cushion 12, as here shown, extends across the lower end of the bar 15 and protrudes slightly beyond the opposed side faces thereof and also extends across the side and lower edges of the knob, by which arrangement the cushion not only acts as an anti-slip element but also serves as a guard or shield to prevent the fabric of the hose from coming into contact with metal of which the yoke C is formed where the fabric loops around and under the knob thus protecting the fabric of the hose against injury at this point at which point the fabric is usually thin and unreinforced and at which point the fabric is subjected to considerable strain.

Another important feature of the invention resides in the provision of the straight elongated upper edge on the transverse end bar 15 of the yoke C since it affords ample spacing between the connected ends of the side members 13 and 14 to accommodate the fabric wound around the end member 15 and the knob 11 to permit the fabric to be spread out where it passes through the yoke and thus avoid bunching of the wound fabric and rendering the connection between the supporter and hose quite thin and flat.

When it is desired to detach the fabric from the yoke C the latter is swung upwardly in the direction opposite that initially employed in effecting connection with the fabric and on the yoke then being swung to the opposite side of the yoke C a slight pull on the fabric will effect release thereof.

I claim:

1. In a hose supporter, a hose engaging yoke, and a support on which the ends of said yoke are pivoted to permit swinging movement of said yoke completely around the pivotal axis; said yoke being unobstructed at its open end and throughout the space bordered thereby and adapted to be directly engaged with a hose to be supported and to effect wrapping of the hose thereon on rotating said yoke on its support, said yoke being elongated to accommodate the fabric wrapped thereon entirely within said unobstructed space, and an elastic friction element on said hose engaging yoke including a knob on said yoke and a resilient covering means thereon for holding the hose wrapped on said yoke against slipping thereon.

2. In a hose supporter, a pair of pivotally interconnected yokes, and a knob carried on one of the said yokes projecting longitudinally from the closed end thereof, an elastic cushioning material on said knob, said last named yoke being operable to swing through the other yoke to effect complete rotation thereof, and said yokes being formed with an open space leading therebetween.

3. In a hose supporter, a supporting yoke having aligned apertures in the end portions thereof, a second yoke having out-turned end portions pivotally engaging said apertures, said last named yoke being formed to swing through said first named yoke, and cushion means on said last named yoke astride of which a fabric may be imposed including a knob on said yoke and a resilient covering means thereon adapted to frictionally engage the fabric imposed thereon.

4. In a hose supporter, a hose engaging yoke, a support on which said yoke is pivoted to swing completely around the pivotal axis, said yoke having elongated side members spaced apart from end to end and a single bar connecting said side members forming the outer end of said yoke, a projection on said bar, and a resilient covering on said projection around which a fabric may be wound on rotating said yoke on said support; the space between the side members and the connecting bar being entirely unobstructed.

5. In a hose supporter, a hose engaging yoke, a support on which said yoke is pivoted to swing completely around the pivotal axis, said yoke having elongated side members spaced apart from end to end and a bar connecting said side members forming the outer end of said yoke, a projection on said bar around which a fabric may be looped on rotating said yoke on said support, and elastic cushioning material on said projection for frictionally engaging a fabric wrapped around said bar; the space bordered by said side members and bar being entirely unobstructed.

6. In a hose supporter, a hose engaging yoke having spaced elongated side members, outturned end portions on said side members, a support on which said end portions are pivoted to swing completely around the pivotal axis, a bar connecting said side members having its upper margin extending parallel to the axis of said end portions around which a fabric may be wrapped on rotating the yoke on said support; said bar being spaced from said end portions and formed to afford an elongated fabric receiving space between said bar and pivoted end portions; to accommodate fabric and wound thereon in spaced relation to the pivotal axis; said space being unobstructed throughout.

7. In a hose supporter, a hose engaging yoke having spaced elongated side members, outturned end portions on said side members, a support on which said end portions are pivoted to swing completely around the pivotal axis, a bar connecting said side members extending parallel to the axis of said end portions around which a fabric may be wrapped on rotating the yoke on said support; said bar being spaced from said end portions to afford an elongated fabric receiving space between said bar and pivoted end portions, said space being unobstructed throughout, and a friction element on said yoke for holding a fabric wrapped around said bar against slipping thereon comprising a projection on said bar and a resilient covering means on said projection.

8. In a hose supporter, a hose engaging yoke, a pair of supports, on which said yoke is pivoted to rotate completely around the pivotal axis, said yoke being elongated longitudinally and having an elongated transverse member spaced from its pivotal connection with said support around which a fabric may be wound on rotating said yoke on said supports, the space between said transverse member and the pivotal connection between the yoke and supports being unobstructed throughout and adapted to accommodate fabric wound on said transverse member remote from said pivotal connection and being open between the pivotal connections of the yoke to said supports.

9. In a hose supporter, a hose engaging yoke, a support on which said yoke is pivoted to rotate completely around the pivotal axis, said yoke being elongated longitudinally and having an elongated transverse member spaced from its pivotal connection with said support around which a fabric may be wound on rotating said yoke on said support, the space between said transverse member and the pivotal connection between the yoke and support being elongated and unobstructed throughout to entirely accommodate fabric wound on said transverse member remote from said pivotal connection, and cushion means associated with said transverse member including a projection on said transverse member and a resilient covering thereon for frictionally engaging a fabric wound around said transverse member.

10. In a hose supporter, a hose engaging yoke, a support on which one end portion of said yoke is pivoted to swing completely around the pivotal axis, said yoke being open and unobstructed between its side members at its pivoted end portion, the closed end portion of said yoke being adapted to have a fabric wrapped therearound on rotating said yoke around its axis, said yoke having an elongated unobstructed space between its side members for accommodating the fabric wrapped on the yoke entirely within said space, and a yieldable means on the closed end portion of said yoke comprising an extension on the closed end portion of said yoke and a resilient covering on said extension for frictionally engaging a fabric wrapped thereon.

11. In a hose supporter, a hose engaging yoke having an open and a closed end, a support on which the open end of said yoke is pivoted to permit swinging movement of said yoke around the pivotal axis to effect wrapping of a portion of a hose around the closed end thereof, a projection on the closed end of the yoke for receiving a looped portion of the wound fabric, and an elastic cushioning material carried on said projection arranged to engage the adjacent faces of fabric looped around said projection to aid in holding the looped fabric against slipping on said projection.

JAMES G. TOMPKINS.